July 19, 1927.  J. S. HETTINGER  1,636,363
GASKET
Filed June 19, 1925    3 Sheets-Sheet 1

WITNESSES:
Evelyn Crompton
George A. Gruss

INVENTOR
Jennie S. Hettinger
BY Joshua R. H. Potts
HER ATTORNEY

July 19, 1927.

J. S. HETTINGER

GASKET

Filed June 19, 1925

1,636,363

3 Sheets-Sheet 3

WITNESSES:
Evelyn Crompton
George A. Gruss

INVENTOR
Jennie S. Hettinger
BY
Joshua R.H.Potts
HER ATTORNEY

Patented July 19, 1927.

1,636,363

UNITED STATES PATENT OFFICE.

JENNIE S. HETTINGER, OF CAMDEN, NEW JERSEY, ASSIGNOR TO UNITED STATES ASBESTOS CO., OF MANHEIM, PENNSYLVANIA.

GASKET.

Application filed June 19, 1925. Serial No. 38,213.

My invention relates to gaskets especially adapted for use in apparatus used for high temperature work.

The gaskets now used for this purpose are made of a spirally wound metallic strip having an asbestos filler packed between its coils.

The chief objection to these gaskets is that it is difficult to keep the free end of the spirally wound strip secured to the gasket. The usual way of securing this end is by soldering it to the outer edge of the gasket which is objectionable because the solder becomes loose from heat and allows the strip to unwind and the gasket to fall apart. Another objection is that the asbestos is not firmly clamped between the coils and is easily dislodged by ordinary handling.

The objects of my invention are to provide a gasket in which the free end of the spirally wound strip may be permanently secured to the outer edge of the gasket without soldering; in which the filler will be securely clamped between the coils of the strip, and in which the filler may extend well out from between the coils of the spiral strip without danger of being dislodged by handling.

Figure 1:
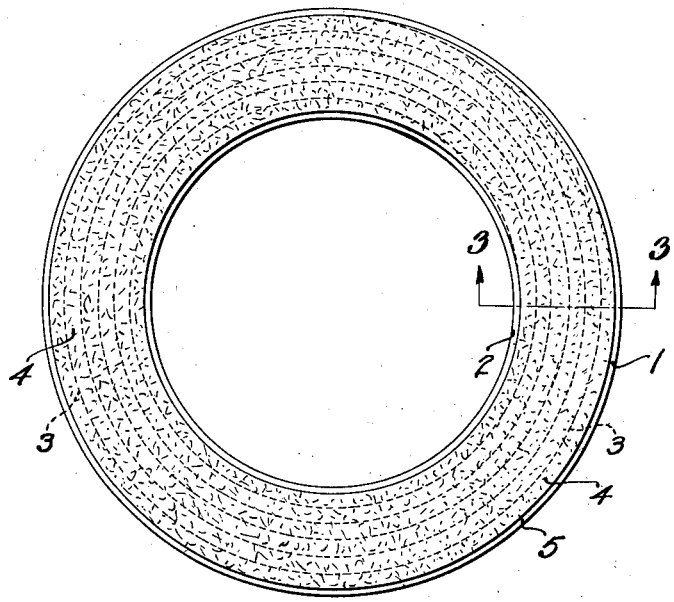
Figure 2:
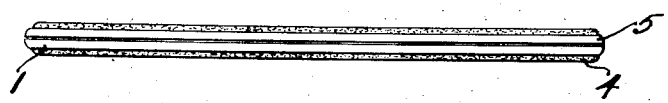
Figure 3:
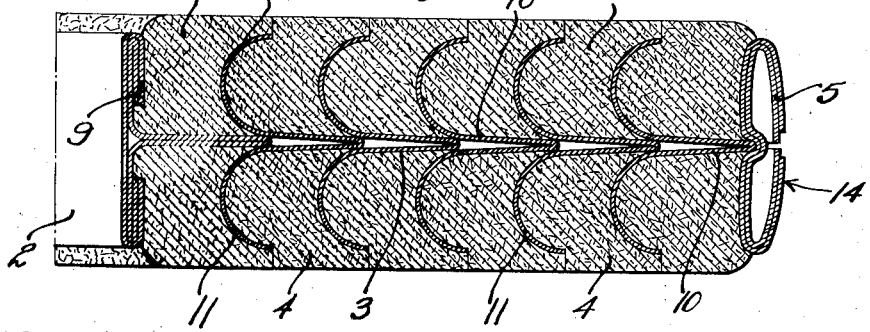

These objects, and other advantageous ends which will be described hereinafter, I attain in the following manner, reference being had to the accompanying drawings in which Figure 1 is a plan view of a gasket made in accordance with my invention, Figure 2 an edge view of the gasket shown in Figure 1, Figure 3 an enlarged section taken on line 3—3 of Figure 1, Figure 4 a perspective view partly broken away of the gasket shown in Figure 1 illustrating how the parts are fastened to each other, and Figure 5 a perspective view of a spiral strip which forms a part of my invention.

Referring to the drawings, 1 indicates a coiled metallic strip having a plain part 2 near its inner end which, when the coils are fastened to each other, forms the inner edge of the gasket, a central part 3 of substantially T-shaped cross section which includes a plurality of coils which when fastened in place, is adapted to clamp a filler 4 of asbestos, and a plain part 5 near its outer end which forms the outer edge of the gasket.

The plain part 2 of the strip when coiled to form the inner edge of the gasket, is fastened by attaching a struck-out lug 6, on the end of the strip, to an opening 7 near the T-shaped part 3 of the strip. This makes one coil of the spiral. The T-shaped part of the strip is then coiled around this first coil to a point 8 or thereabout and the edges of the coiled part of the strip are then peened so that the coiled parts will be fastened to each other as shown at 9. The T-shaped part of the strip is formed by folding the strip centrally between its edges, by means of dies, to form what will hereinafter be termed the shank 10 of the T, and curving its edges outwardly and back toward the shank to form what will hereinafter be termed the cross bar 11 of the T, the curvature of the parts constituting the cross bar being such as to form a hook of semi-circular form. Each curved half of the cross bar is clamped under the edge of the first coil of the strip up to the point 8 or thereabout, where the curved halves leave the peened edges. The T-shaped part of the strip is then wound around the coiled part so that the shank 10 abuts cross bar 11 between the curved parts and an additional turn made with the plain outer end 5 to the point 12, where the shank 10 of the T merges into the plain part, the shank 10 keeping this turn spaced from the cross bar 11. The filler is clamped between each turn of the T-shaped part 3 and the adjacent turn during the winding operation and is held firmly in place due to the hook-like formation of the arms of the cross bar. The plain part 5 of the strip is then given approximately three-fourths of a turn, ending at a point designated in Figure 4 by the numeral 13. The edges of the part 5 are then folded outwardly with the edges of the first turn of part 5 overlapping and embracing the outer turn as shown at 14 in Figures 3 and 4. Thus the outer end of the strip is also rigidly secured without the use of auxiliary fastening means.

Figure 4:
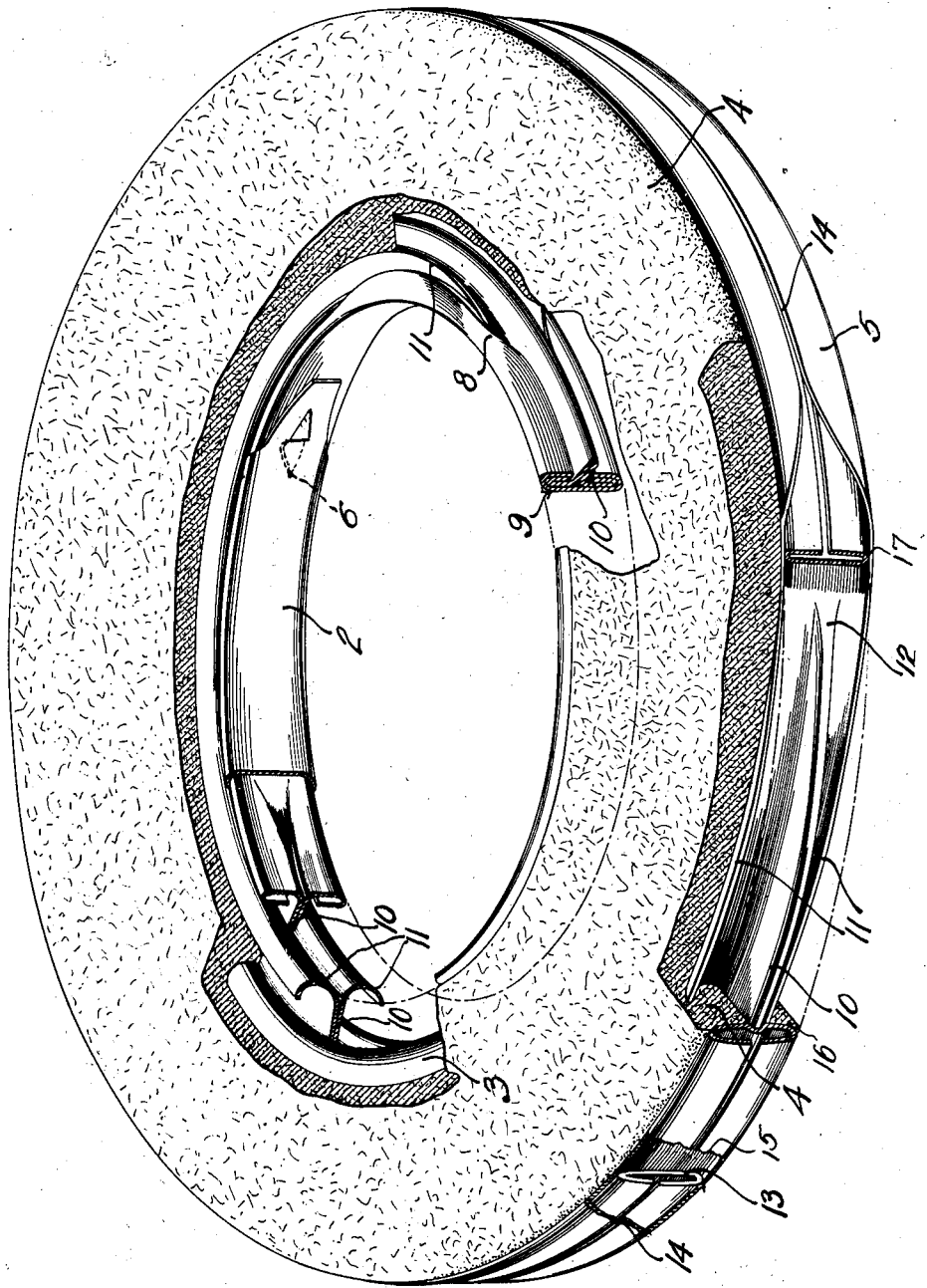
Figure 5:
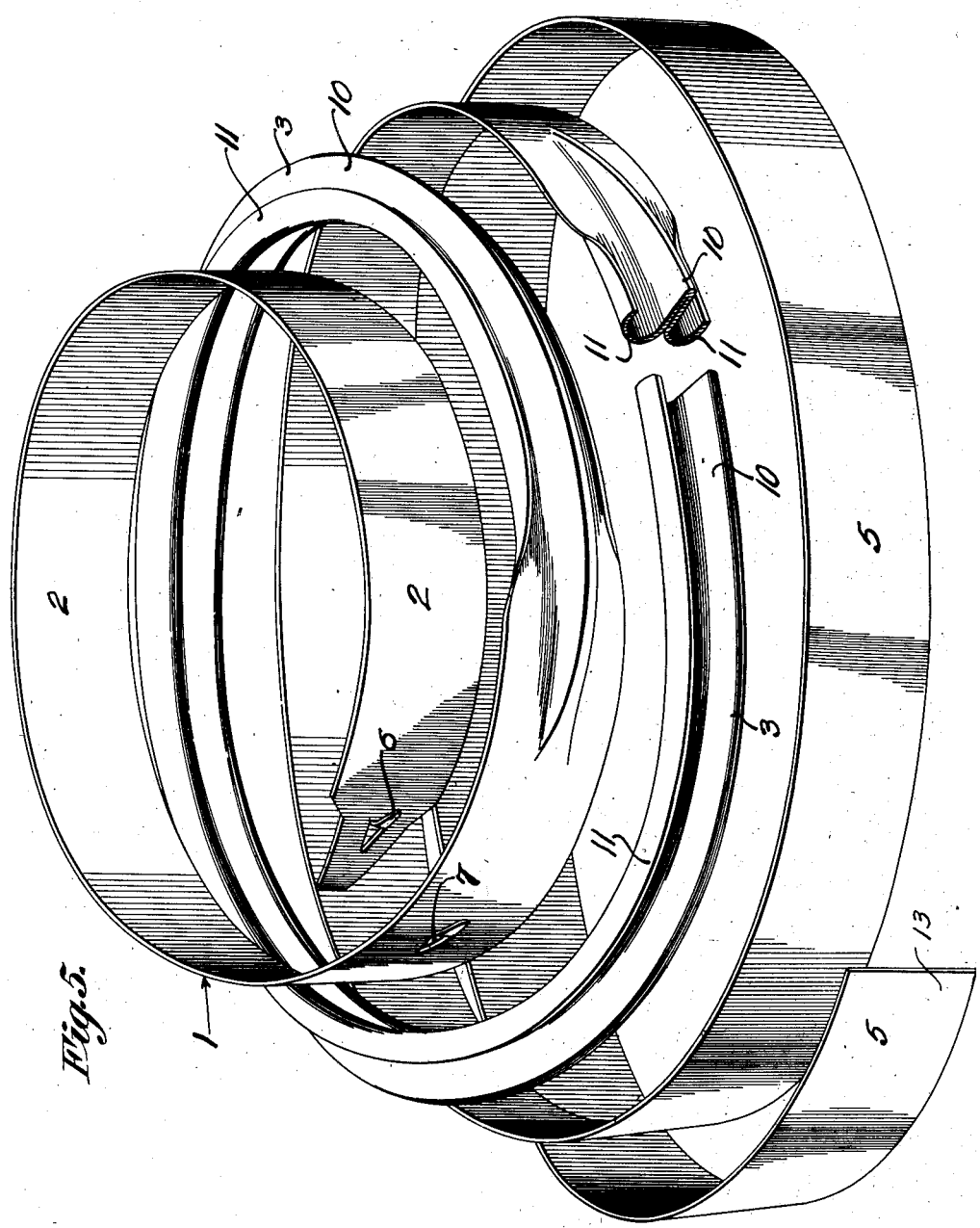

This construction is plainly shown in Figure 4, in which the first turn of the plain part 5 has its folded over portions broken away between points 14 and 15, in order to show the end of the last turn at 13, and is broken away entirely between points 16 and 17 to show where the T-shaped part merges into the plain part at 12. It will be noted that the plain parts 2 and 5, after being folded, are approximately the same width as the cross arms 11 of the T-shaped part 3.

A gasket made in this manner will remain intact under high temperatures because the outer end of the strip is not held by solder but is clamped under the edges of the strip. The filler between the coils of the spiral cannot be readily dislodged by handling because the curved parts of cross bar 11 grip and securely hold it between the coils, thus enabling the use of a gasket having a thick face of filler extending well beyond the edges of the strip. This gasket will form a perfect seal and will maintain this seal under high temperatures.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A gasket including a spirally wound strip of substantial T cross-section arranged with the shank of the T of one coil extending to but not substantially beyond the cross bars of the T of the adjacent coil, each half of the cross bar being curved toward the shank to form a semi-circular hook, and a filler between the coils.

2. A gasket including a spirally wound strip having its outer end clamped by having the edges of the outer spirals folded outwardly with the folded edges of the outer spiral embraced and gripped by the folded edges of the adjacent spiral, and a filler between the coils.

3. A gasket including a spirally wound strip having its edges near the inner end turned over the edges of the adjacent coil and the edges of the outer end of the strip turned over so that the outer coil is embraced and gripped by the turned over edges of the adjacent coil, and a filler between the coils.

4. A gasket including a spirally wound strip having a plain part at its inner end folded over the adjacent coil to form the inner edge of the gasket, a plain part at its outer end folded over so that the outer coil is embraced and gripped by the turned over edges of the adjacent coil to form the outer edge of the gasket, a T-shaped part, having hook-shaped cross bars, between the ends arranged with the shank of the T of one coil extending to but not substantially beyond the point where the hook-shaped cross bars join the shank of the T of the adjacent coil, and a filler between the coils.

5. A gasket including a spirally wound strip having its edges near the outer end turned over so that the outer edge is embraced and gripped by the turned over edges of the adjacent coil, the edges of the inner end turned over the edges of the adjacent coil, a lug struck out from the inner end of the strip and engaging an aperture in the adjacent coil, and a filler between the coils.

In testimony whereof I have signed my name to this specification.

JENNIE S. HETTINGER.